US006968177B2

(12) United States Patent
Miller et al.

(10) Patent No.: US 6,968,177 B2
(45) Date of Patent: Nov. 22, 2005

(54) TRANSPORT AGNOSTIC AUTHENTICATION OF WIRELESS DEVICES

(75) Inventors: Quentin S. Miller, Sammamish, WA (US); Donald J. McNamara, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 10/300,139

(22) Filed: Nov. 19, 2002

(65) Prior Publication Data

US 2004/0203599 A1 Oct. 14, 2004

(51) Int. Cl.[7] ................................................ H04M 1/66
(52) U.S. Cl. .................. 455/411; 455/410; 455/414.1; 455/414.3; 455/412.1
(58) Field of Search ........................... 455/414.1, 411, 455/414.3, 466, 410, 412.1, 404.2, 456.1; 370/338; 705/44, 74

(56) References Cited

U.S. PATENT DOCUMENTS

| | | | | |
|---|---|---|---|---|
| 6,078,908 | A | | 6/2000 | Schmitz ........................ 705/50 |
| 6,112,078 | A | | 8/2000 | Sormunen et al. ........... 455/411 |
| 6,377,804 | B1 | * | 4/2002 | Lintulampi ............... 455/435.2 |
| 6,560,456 | B1 | * | 5/2003 | Lohtia et al. ................ 455/445 |
| 2001/0055379 | A1 | * | 12/2001 | Mamiya et al. ......... 379/201.05 |
| 2002/0184302 | A1 | * | 12/2002 | Prueitt et al. ................ 709/203 |
| 2003/0091016 | A1 | * | 5/2003 | Ko et al. ..................... 370/338 |
| 2003/0104827 | A1 | * | 6/2003 | Moran et al. ................ 455/466 |
| 2003/0149583 | A1 | * | 8/2003 | Ergezinger et al. ............. 705/1 |
| 2003/0157899 | A1 | * | 8/2003 | Trossen et al. ................ 455/69 |
| 2004/0030935 | A1 | * | 2/2004 | Kai ............................ 713/202 |
| 2004/0098625 | A1 | * | 5/2004 | Lagadec et al. ............. 713/201 |
| 2004/0166832 | A1 | * | 8/2004 | Portman et al. .......... 455/412.1 |
| 2004/0176092 | A1 | * | 9/2004 | Heutschi ................... 455/435.1 |
| 2004/0203900 | A1 | * | 10/2004 | Cedervall et al. ......... 455/456.1 |
| 2005/0096013 | A1 | * | 5/2005 | Lehikoinen et al. ......... 455/411 |

FOREIGN PATENT DOCUMENTS

| | | | |
|---|---|---|---|
| DE | 199 38 201 | 2/2001 | ............ H04Q 7/06 |
| WO | WO 99/44114 | 9/1999 | ............. G06F 1/00 |

* cited by examiner

*Primary Examiner*—Urban Edward
*Assistant Examiner*—Dai Phuong
(74) *Attorney, Agent, or Firm*—Workman Nydegger

(57) ABSTRACT

A wireless device and a receiving computing system communicate over a carrier network. The wireless device submits a request for service to the receiving computing system, which then returns an authentication key. The authentication key is routed using the telephone number stated in the request for service as being associated with the wireless device. However, the authentication key is dispatched over a different data transport mechanism. For example, the request may be submitted using an IP data transport mechanism, while the authentication key is returned using an SMS data transport mechanism. The wireless device then evidences, through appropriate communication, that the wireless device both submitted the request and received the response. Accordingly, the telephone number is verified as being associated with the telephone number.

20 Claims, 3 Drawing Sheets

TRANSPORT AGNOSTIC AUTHENTICATION OF WIRELESS DEVICES

BACKGROUND OF THE INVENTION

1. The Field of the Invention

The present invention relates to mobile communications technology, and more specifically, to mechanisms for authenticating that a telephone number belongs to a wireless device that requests service.

2. Background and Related Art

Computing technology has revolutionized the way people work and play and has contributed enormously to the advancement of humankind. Computers now aid in enumerable applications such as word processing, computer simulations, advanced gaming, voice recognition, among many more. Computing systems now come in a wide-variety of forms including, for example, desktop computers, laptop computers, Personal Digital Assistants (PDAs), and even mobile telephones and devices.

Some mobile wireless devices such as Personal Digital Assistants and wireless telephones have sophisticated memory and general processing capability that allow the mobile device to perform many tasks previously only performed by larger desktop computers. These tasks may even include tasks (e.g., communicating e-mail, accessing the Web, and participating in instant messaging) that require communication over data networks.

One of the purposes of wireless devices is to allow their associated users to have access to remotely stored information and remotely managed services even while the user is mobile. In order to accomplish this purpose, wireless devices often submit requests for service over a cellular carrier network to a server computing system. The wireless device typically identifies itself using the telephone number. The server then typically responds by returning the requested information over the cellular network. If the wireless device misrepresented its telephone number, absent proper authentication, the wireless device may inappropriately misrepresent itself and may potentially be granted access to unauthorized information and services.

Accordingly, it would be advantageous to have mechanisms in which the authenticity of a telephone number reported in a request from a wireless device may be properly verified as belonging to that wireless device.

BRIEF SUMMARY OF THE INVENTION

The foregoing problems with the prior state of the art are overcome by the principles of the present invention, which are directed towards mechanisms that authenticate a wireless device over a carrier network by using different data transport mechanisms available over the carrier network during different portions of the authentication process.

The wireless device submits a request for service to a receiving computing system, which then returns an authentication key as a response. The authentication key is routed using the telephone number stated in the request for service as being associated with the wireless device. However, the authentication key is dispatched over a different data transport mechanism. For example, the request may be submitted using an Internet Protocol (IP) data transport mechanism, while the authentication key may be returned using a Short-text Messaging Service (SMS) data transport mechanism.

The wireless device then evidences, through appropriate communication, that the wireless device both submitted the request and received the authentication key. Since the wireless device received the authentication key, the use of the telephone number resulted in successful delivery of the authentication key. Furthermore, since the authentication key was returned using a different data transport mechanism, the telephone number is independently verified as truly belonging to the wireless device.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to network environment in which a wireless device dispatches a request for service over a carrier network to a receiving computing system. The receiving computing system then returns a response to the request over a different data transport mechanism as was used to communicate the request. The receiving computing system reads the telephone number of the wireless device and uses that telephone number to address the response. The wireless device then communicates with the receiving computing system, the communication evidencing that the wireless device both submitted the request and received the response. Since the response was dispatched using the telephone number to address the response using a different data transport mechanism, the evidence within the communication also evidences that the wireless device truly is associated with the telephone number stated in the request. Accordingly, the wireless device is authenticated by using different data transport mechanisms.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD- ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code.

Figure 1:
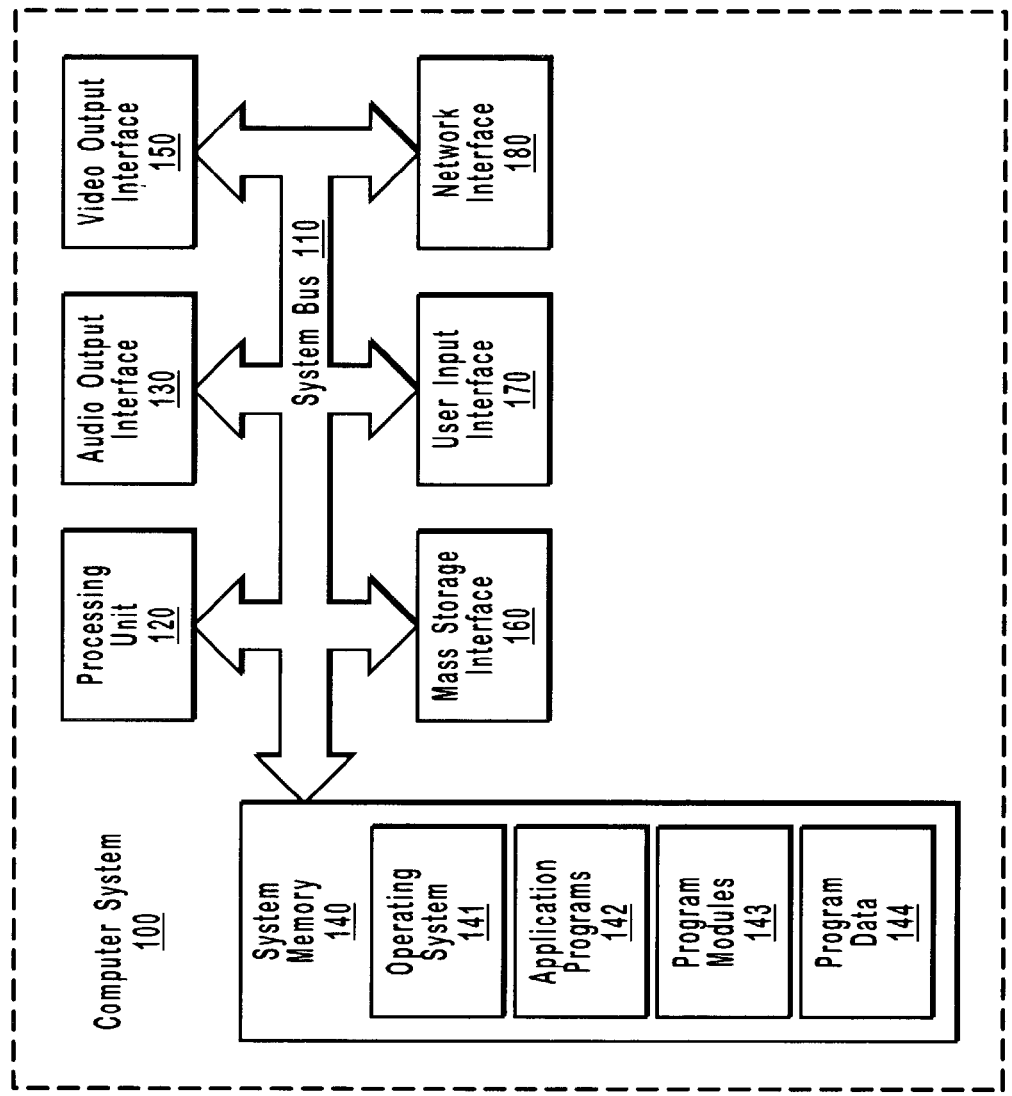
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein.

Computer system 100 includes a user input interface 170 that receives information from an input device, such as, for example, a keyboard, microphone, mouse, or, in the case of a mobile device, a touch pad. An input device can be coupled to user input interface 170 so as to enable the entry of information. An input device may transfer information over such a coupling in response to preprogrammed data or user manipulation of the input device.

Computer system 100 includes a video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal. In the case of a mobile device, the video output interface may interface with a relatively smaller display.

Similarly, computer system 100 includes an audio output interface 130 that provides an audio output signal to external audio output devices. Computer system 100 may also be integrally positioned with or separate from an audio system, which may include a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 may also include mass storage interface 160, although mobile telephones or PDAs typically do not have mass storage devices. The mass storage interface 160 can read data from and/or write data to a mass storage device, such as, for example, a magnetic disk or optical disk. A mass storage device can be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Computer system 100 is connectable to networks, such as, for example, an office-wide or enterprise-wide computer network, an intranet, the Internet, and/or a carrier network. Computer system 100 includes network interface 180, through which computer system 100 receives data from external sources and/or transmits data to external sources. Computer system 100 may exchange data with external sources, such as, for example, remote processor systems and/or databases over such a network.

While FIG. 1 illustrates an example of a computing system that may implement the principles of the present invention, any computing system may implement the features of the present invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
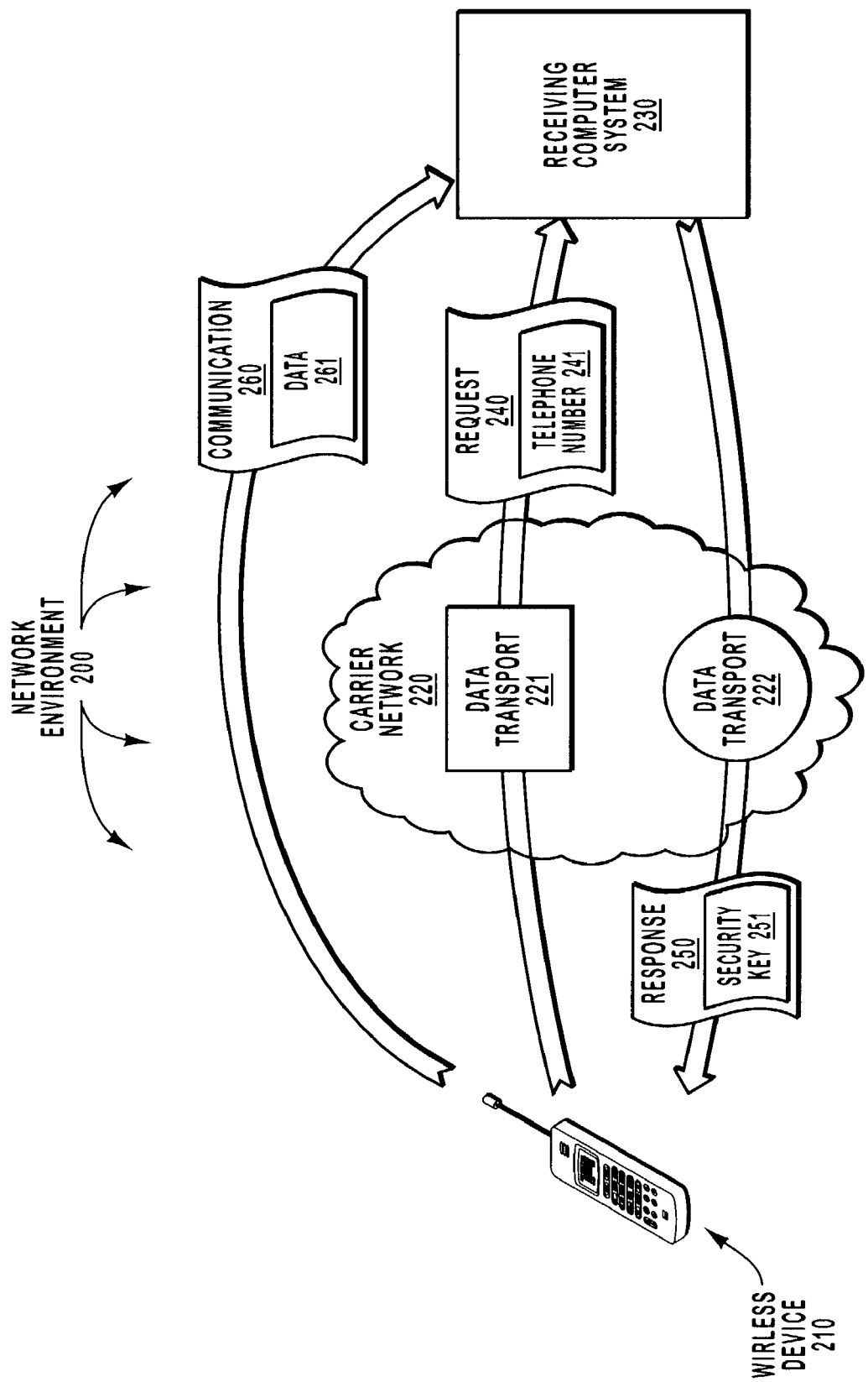
FIG. 2 illustrates a suitable network environment in which the principles of the present invention may operate.

FIG. 2 illustrates a network environment 200 that includes a wireless device 210 and a receiving computing system 230 communicating over a carrier network 220. The wireless device 210 may be any device capable of communicating over a wireless network (whether or not that same wireless device 210 may also be capable of communicating over a wired network). The wireless device 210 may be, for example, a laptop computer, a Personal Digital Assistant (PDA) or a telephone, and may be generally structured as described above with respect to the computer 100.

The receiving computing system 230 may be a proxy computing system that serves a number of wireless devices that are connected, or that may be connected, to a carrier network 220. The receiving computing system 230 may also be structured as described above for computer system 100. In a typical case, however, the wireless device 210 may be smaller than receiving computing system 230 since wireless devices are often mobile, although this need not be the case. The receiving computing system 230 may alternatively be another wireless device or another computing system that is not necessarily associated with or managed by any particular carrier.

Figure 3:
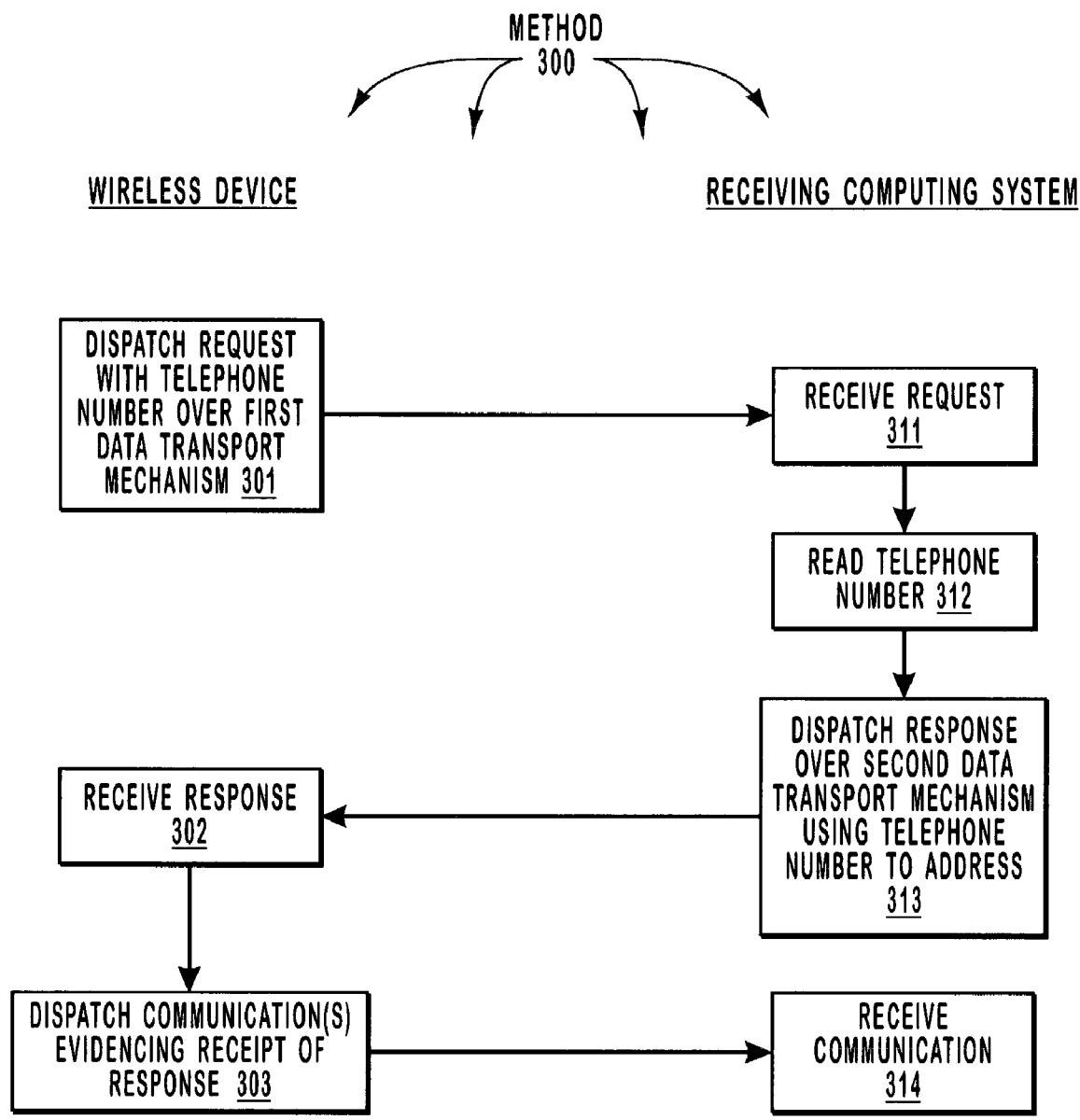
FIG. 3 illustrate a flowchart of a method for authenticating a wireless device in accordance with the principles of the present invention.

Referring to FIG. 3, a method 300 is shown for authenticating the wireless device 210 to the receiving computing system 230. The method 300 may be performed in the network environment 200 of FIG. 2. Accordingly, the method 300 of FIG. 3 will be described with frequent reference to the network environment 200 of FIG. 2.

Several acts of the method 300 are performed by the receiving computing system 230 as represented in the right column of FIG. 3 under the heading "RECEIVING COMPUTING SYSTEM". Other acts of the method 300 are performed by the wireless device 210 as represented in the left column of FIG. 3 under the heading "WIRELESS DEVICE".

The wireless device 210 dispatches a request for service 240 to the receiving computing system 230 over a first data transport mechanism 221 available over the carrier network 220 (act 301). The request for service 240 includes a telephone number 241 of the wireless device. The first data transport mechanism may include any data transport mechanism supported by the carrier network 220 and which is capable of transporting a request for service with a telephone number of the wireless device requesting service.

The receiving computing system 230 then receives the request for service from the wireless device over the first data transport mechanism (act 311), and then reads the telephone number 241 from the request for service 240 (act 312). The receiving computing system then dispatches a response 250 to the request to the wireless device over a second data transport mechanism 222 available over the carrier network (act 313). The response 250 may include a security key 251 or other security information that the wireless device 210 may use to authenticate itself in future communications with the receiving computing system.

The second data transport mechanism may be any mechanism supported by the carrier network 220 which allows the wireless device to be addressed using the telephone number. Note that the first data transport mechanism 221 is illustrated as a square, whereas the second data transport mechanism 222 is illustrated as a circle. This emphasizes that the second data transport mechanism 222 is different than the first data transport mechanism 221. For example, the second data transport mechanism 222 may be Short-text Messaging Service (SMS), Unstructured Supplementary Service Data (USSD), Multimedia Messaging Service (MMS), or the like, while the first data transport mechanism 221 may be Internet Protocol (IP).

The wireless device 210 then receives the response 250 (act 302) and dispatches a communication 260 to the receiving computing system that evidences that the wireless device both sent the request and received the response (act 303). For instance, the communication 260 may include data 261 that evidences that the wireless device 210 both sent the request 240 and received the response 250. The data 261 may be the security key 251 or data derived therefrom. The receiving computing system 230 then receives the communication (act 314). Since the communication 260 may be dispatched using the first data transport mechanism 221, the second data transport mechanism 222, or any other data transport mechanism, whether supported by the carrier network 220 or whether implemented independent of the carrier network 220, the communication 260 is illustrated without necessarily passing through the first data transport mechanism 221, the second data transport mechanism 222, or through the carrier network 220.

Since the wireless device 210 received the authentication key response 250, the use of the telephone number resulted in successful delivery of the authentication key response. Accordingly, by the very fact that the wireless device received the authentication response over a different data transport mechanism, there is a strong inference that the telephone number does indeed belong to the wireless device absent any independent failure mechanism in which the telephone number is wrongly or fraudulently assigned to the wireless device in the context of the second data transport mechanism. Absent such an independent failure mechanism, however, the telephone number is properly verified as belonging to the wireless device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a receiving computing system that is configured to communicate with a wireless device over a carrier network, a method for authenticating the wireless device comprising the following:

an act of receiving a request for service from the wireless device over a first data transport mechanism available over the carrier network;

an act of reading a telephone number from the request for service;

an act of dispatching a response to the request to the wireless device over a second data transport mechanism available over the carrier network, the response to the request including a security key, the second data transport mechanism using the telephone number to address the wireless device; and an act of receiving a communication from the wireless device that evidences that the wireless device both sent the request and received the response, the communication including data that is at least derived from the security key.

2. A method in accordance with claim 1, wherein the act of dispatching a response to the request to the wireless device over a second data transport mechanism available over the carrier network comprises the following:

an act of dispatching the response using Short-text Messaging Service (SMS).

3. A method in accordance with claim 1, wherein the act of dispatching a response to the request to the wireless device over a second data transport mechanism available over the carrier network comprises the following:

an act of dispatching the response using Unstructured Supplementary Service Data (USSD).

4. A method in accordance with claim 1, wherein the act of dispatching a response to the request to the wireless device over a second data transport mechanism available over the carrier network comprises the following:

an act of dispatching the response using Multimedia Messaging Service (MMS).

5. A method in accordance with claim 1, wherein the act of receiving a request for service from the wireless device over a first data transport mechanism available over the carrier network comprises the following:

an act of receiving the request for service using Internet Protocol (IP).

6. A method in accordance with claim 5, wherein the act of dispatching a response to the request to the wireless device over a second data transport mechanism available over the carrier network comprises the following:

an act of dispatching the response using Short-text Messaging Service (SMS).

7. A method in accordance with claim 5, wherein the act of dispatching a response to the request to the wireless device over a second data transport mechanism available over the carrier network comprises the following:

an act of dispatching the response using Unstructured Supplementary Service Data (USSD).

8. A method in accordance with claim 5, wherein the act of dispatching a response to the request to the wireless device over a second data transport mechanism available over the carrier network comprises the following:

an act of dispatching the response using Multimedia Messaging Service (MMS).

9. A computer program product for use in a receiving computing system that is configured to communicate with a wireless device over a carrier network, the computer program product for implementing a method for authenticating the wireless device, the computer program product comprising one or more computer-readable media having thereon the following:

computer-executable instructions for detecting receipt of a request for service from the wireless device over a first data transport mechanism available over the carrier network;

computer-executable instructions for reading a telephone number from the request for service;

computer-executable instructions for causing a response to the request to be dispatched to the wireless device over a second data transport mechanism available over the carrier network, the response to the request including a security key, the second data transport mechanism using the telephone number to address the wireless device; and computer-executable instructions for receiving a communication from the wireless device that evidences that the wireless device both sent the request and received the response, the communication including data that is at least derived from the security key.

10. A computer program product in accordance with claim 9, wherein the one or more computer-readable media are physical storage media.

11. In a wireless device that is configured to communicate with a receiving computing system over a carrier network, a method for the wireless device supporting its own authentication to the receiving computing system comprising the following:

an act of dispatching a request for service to the receiving computing system over a first data transport mechanism available over the carrier network, the request for service including a telephone number of the wireless device;

an act of receiving a response to the request over a second data transport mechanism available over the carrier network, the response to the request including a security key, the second data transport mechanism using the telephone number to address the wireless device; and an act of dispatching a communication to the receiving computing system that evidences that the wireless device both sent the request and received the response, the communication including data that is at least derived from the security key.

12. A method in accordance with claim 11, wherein the act of receiving a response to the request over a second data transport mechanism available over the carrier network comprises the following:

an act of receiving the response using Short-text Messaging Service (SMS).

13. A method in accordance with claim 11, wherein the act of receiving a response to the request over a second data transport mechanism available over the carrier network comprises the following:

an act of receiving the response using Unstructured Supplementary Service Data (USSD).

14. A method in accordance with claim 11, wherein the act of receiving a response to the request over a second data transport mechanism available over the carrier network comprises the following:

an act of receiving the response using Multimedia Messaging Service (MMS).

15. A method in accordance with claim 11, wherein the act of dispatching a request for service to the receiving computing system over a first data transport mechanism available over the carrier network comprises the following:

an act of dispatching the request for service using Internet Protocol (IP).

16. A method in accordance with claim 15, wherein the act of receiving a response to the request over a second data transport mechanism available over the carrier network comprises the following:

an act of receiving the response using Short-text Messaging Service (SMS).

17. A method in accordance with claim 15, wherein the act of receiving a response to the request over a second data transport mechanism available over the carrier network comprises the following:

an act of receiving the response using Unstructured Supplementary Service Data (USSD).

18. A method in accordance with claim 15, wherein the act of receiving a response to the request over a second data transport mechanism available over the carrier network comprises the following:

an act of receiving the response using Multimedia Messaging Service (MMS).

19. A computer program product for use in a wireless device that is configured to communicate with a receiving computing system over a carrier network, the computer program product for implementing a method for the wireless device supporting its own authentication to the receiving computing system, the computer program product comprising one or more computer-readable media having thereon the following:

computer-executable instructions for causing a request for service to be dispatched to the receiving computing system over a first data transport mechanism available over the carrier network, the request for service including a telephone number of the wireless device;

computer-executable instructions for detecting receipt of a response to the request over a second data transport mechanism available over the carrier network, the response to the request including a security key, the second data transport mechanism using the telephone number to address the wireless device; and computer-executable instructions for causing a communication to be dispatched to the receiving computing system, the communication evidencing that the wireless device both sent the request and received the response, the communication including data that is at least derived from the security key.

20. A computer program product in accordance with claim 19, wherein the one or more computer-readable media are physical storage media.

* * * * *